United States Patent [19]

Fan et al.

[11] Patent Number: 4,889,887

[45] Date of Patent: Dec. 26, 1989

[54] GELABLE ACID VISCOSIFIERS

[75] Inventors: You-Ling Fan; James P. Stanley, Bound Brook; George L. Brode, Bridgewater, all of N.J.

[73] Assignee: Union Carbide Chemicals and Plastics Company Inc., Danbury, Conn.

[21] Appl. No.: 159,826

[22] Filed: Feb. 22, 1988

Related U.S. Application Data

[63] Continuation of Ser. No. 864,273, May 19, 1986, abandoned.

[51] Int. Cl.$^4$ ............................ C08K 3/16; C08K 5/09; C08L 39/00
[52] U.S. Cl. .................................. 524/510; 524/512; 524/521; 525/142; 525/157
[58] Field of Search ............... 525/132, 142, 154, 155, 525/157, 212, 218; 524/510, 512, 521

[56] References Cited

U.S. PATENT DOCUMENTS

| | | | |
|---|---|---|---|
| 2,965,594 | 12/1960 | Maeder | 525/142 |
| 3,943,966 | 3/1976 | Guilbault et al. | 166/293 |
| 4,002,588 | 1/1977 | Strazdins | 525/155 |
| 4,022,731 | 5/1977 | Schmitt . | |
| 4,191,657 | 3/1980 | Swanson | 252/855 |
| 4,265,795 | 5/1981 | Sekmakas | 525/142 |
| 4,452,940 | 6/1984 | Chu et al. | 524/801 |
| 4,476,033 | 10/1984 | Josephson | 252/855 |
| 4,483,959 | 11/1984 | Maslanka | 525/154 |
| 4,499,232 | 2/1985 | Engelhardt et al. | 524/548 |
| 4,500,437 | 2/1985 | Engelhardt et al. | 252/855 |
| 4,507,440 | 3/1985 | Engelhardt et al. | 525/218 |
| 4,529,782 | 7/1985 | Fan et al. | 526/240 |

FOREIGN PATENT DOCUMENTS 1133788 10/1982 Canada .
0122073 10/1984 European Pat. Off. .

*Primary Examiner*—Christopher Henderson
*Attorney, Agent, or Firm*—Henry H. Gibson

[57] ABSTRACT

Gelable acid compositions containing novel crosslinkable copolymers and the novel copolymers. The copolymers contain an N-(alkoxymethylene)acrylyl moiety. In addition there are provided gelable acid compositions containing a group of polyfunctional reactants that contain a plurality of —$CH_2OH$ and/or —$CH_2CH_2OH$ groups in the molecule.

8 Claims, No Drawings

GELABLE ACID VISCOSIFIERS

This application is a continuation of prior U.S. application Ser. No. 864,273, filed May 19, 1986, now abandoned.

The use of polymeric compositions to thicken or viscosify acid compositions is well known and commonly practiced in the gas and oil recovery field. Though many polymers are used, problems are often encountered, e.g., loss of viscosity of the acid composition, precipitation of the polymer from solution, degradation resulting from exposure to elevated temperatures in the subterranean formation, and sensitivity to calcium ions. It is also a practice to add components to the acid solution or to the viscosifying polymer to assist retention of solution viscosity and thermal thinning at the elevated temperatures encountered in the subterranean formations. The compositions of this invention have been found to alleviate some of the problems by enabling the production of gelable acid viscosifiers.

U.S. Pat. No. 4,191,657, issued to B. L. Swanson on Mar. 4, 1980, discloses the use of water dispersible polymers based on acrylamide or methacrylamide, the hydrolyzed polymers thereof, the crosslinked polymers thereof, the hydrolyzed crosslinked polymers thereof, and copolymers thereof with other monomers, in the production of acid compositions suitable for matrix-acidizing or fracture-acidizing substerranean formations. In addition, it also discloses and claims the use of aldehydes capable of causing gelation of the aqueous dispersion of the acidizing composition. However, it nowhere discloses our claimed invention.

U.S. Pat. No. 4,022,731, issued to J. M. Schmitt on May 10, 1977, discloses the use of water soluble copolymers of acrylic acid or methacrylamidopropyltrimethylammonium chloride in water-in-oil emulsions useful as fluid loss additives for aqueous hydraulic cement slurries. However, there is no reference to gelable compositions.

U.S. Pat. No. 3,943,966, issued to L. J. Guildbault on Mar. 16, 1976, discloses cement compositions, used in well cementing operations, that contain the water soluble polymers of methylacrylamidopropyltrimethylammonium chloride as fluid loss additives for the cements. No mention of gelable compositions is present.

U.S. Pat. No. 4,452,940, issued to M. R. Rosen on June 5, 1984 and U.S. Pat. No. 4,529,782, issued to Y. L. Fan et al. on July 16, 1985, discloses the production of water-in-oil emulsions and water soluble polymers. However, they do not disclose their use in producing gelable viscosified acid compositions.

U.S. Pat. No. 4,529,782, issued to Y. L. Fan et al. on July 16, 1985, discloses high molecular weight water soluble acrylamide containing polymers for use in purifying water but makes no mention of gelable compositions.

U.S. Pat. No. 4,476,033, issued to C. B. Josephson on Oct. 9, 1984, relates to gelable acidic compositions useful in treating wells and subterranean formations. Acid-labile precursors such as aldehyde derivatives are used to react in the acid composition to produce aldehydes and the produced aldehyde reacts with the polymer in the acid composition to gel the composition. Though gelation additives and gelable compositions are disclosed there is no suggestion or disclosure of the additives found useful in this patent specification.

U.S. Pat. No. 4,499,232, issued to F. Engelhardt on Feb. 12, 1985, discloses viscous aqueous acid compositions wherein the viscosifier is a polymer containing crosslink bridges of the formula —NR′—CH=N—CO— in which R′ is hydrogen, alkyl or methylol. The materials used to obtain the crosslink are not those used in this patent specification, nor is the crosslink bridge of the same structure.

U.S. Pat. No. 4,500,437, issued to F. Engelhardt on Feb. 19, 1985, discloses the use of the therein defined copolymers as friction reducers in acidizing compositions. However, there is no mention of gelation, nor are any of the materials disclosed those that are used as the "polyfunctional reactants" in this application.

U.S. Pat. No. 4,507,440, issued to F. Engelhardt et al. on Mar. 26, 1985, discloses polymers crosslinked with the —NR′—CH=N—C—O— bridge, the crosslink being formed by the reaction in acidic solution between a compound having at least two formylamido groups and a polymer having at least two amidocarbonyl groups. This patent is related to U.S. Pat. No. 4,499,232. The compositions are not those of the instant application.

European Patent Application No. 0122073, published on Oct. 17, 1984, discloses a terpolymer of acrylamide/sodium styrene sulfonate/methacrylamidopropyltrimethylammonium chloride and its use in drilling muds having a basic pH of about 10 to 10.5. Not only are the polymers different than those of this invention, but it is not concerned with highly acidic viscosified acid compositions nor gelable compositions.

Canadian Pat. No. 1,133,788, issued to K. G. Phillips et al. on Oct. 19, 1982, discloses water soluble polymers containing acrylic acid and methacrylamidopropyltrimethylammonium chloride and their uses in various industries. However, the reference makes no mention of gelable acid viscosifiers.

Generally, any water soluble polymer or copolymer can be used with the polyfunctional reactants hereinafter disclosed to produce gelable or crosslinked compositions. In this application the effort is concentrated on crosslinked acid viscosifier compositions used in gas and oil recovery from subterranean formations. With this in mind, among the polymers of great interest are those identified by Generic formulas (A), (B), (C), and (D) as well as those containing the N-(alkoxymethylene)-acrylamide comonomer polymerized in the molecule. The cationic, anionic and amphoteric polymers described below are essentially water soluble and can be used to prepare crosslinked viscosified acid compositions having improved properties in accordance with this invention.

THE INVENTION

This invention is directed to copolymers containing a comonomer component, as hereinafter defined, that are useful as acid viscosifiers. The copolymers are capable of self-crosslinking, since they contain all of the components required for crosslinking in the molecule, and readily crosslink in acid to form crosslinked acid viscosified compositions. The polymers are essentially one-package gelable acid viscosifiers.

This invention is also directed to certain polyfunctional reactants, as hereinafter defined, which upon addition to aqueous viscosified acid compositions form crosslinkable viscosifier compositions that crosslink the viscosifying agent under the proper conditions.

Acid treating or acidizing of porous subterranean formations is an accepted procedure for increasing the yield and/or production of fluids from the well, be they liquid or gaseous. These procedures are so well known and so extensively practiced that detailed explanation is neither necessary nor of assistance to one of ordinary skill in this field. Suffice it to say it is an internationally practiced procedure to acid treat wells and the patent and related published technical literature is replete with material detailing the procedure.

Though there is an abundance of published material and commercial compositions available, the industry is continuously looking for improvements. Among the problems that still exist are inadequate penetration of the acid into the formation, fluid loss in the more porous zones of the formation and leak-off at the fracture faces, any one of which may have a deleterious effect on the well's production. Among the attempts that have been made to resolve some of these problems has been the addition of various polymeric thickening agents. These agents serve to thicken the acid solution and increase its viscosity and in many instances the higher viscosity or thickened acid solutions have reduced fluid loss properties. In this regard attention is directed to U.S. Pat. No. 3,415,319 (B. L. Gibson) and U.S. Pat. No. 3,434,971 (B. L. Atkins). It has also been indicated that these thickened acid solutions show a lesser reaction rate with the acid-soluble portions of the formation. In this regard attention is directed to U.S. Pat. No. 3,749,169 (J. F. Tate), U.S. Pat. No. 3,236,305 (C. F. Parks) and U.S. Pat. No. 3,252,904 (N. F. Carpenter).

The higher viscosities additionally have an advantage in fracture-acidizing operations because these thicker and more viscous acid solutions produce longer and wider fractures. They are also more effective in carring propping agents into the formation when they are employed.

A problem existing in acidizing operations is the instability of the viscosifier in the acid solution to heat. This problem can be particularly troublesome when using acidizing solutions that contain thickening or viscosifying agents. Stability to heat, the retention of the increased or higher viscosity properties of the acidizing mixture under the conditions existing in the well or formation is important. The most satisfactory acidizing mixtures or compositions are those which are sufficiently stable to resist degradation by the heat in the well and, particularly, in the formation for a period of time sufficient to accomplish the intended purposes of good penetration and/or significant etching of the formation. The degree of stability or thermal thinning will vary from one formation to another, as is known, and is dependent on many factors present during the operation. For instance the size and depth of the well, the composition of the viscosifying agent, the type of subterranean formation present, the concentration of the acid in the acidizing solution, the temperature conditions existing throughout the well bore and the formation, etc. All of these factors as well as many others are known to affect the stability and thermal thinning behavior of the acidizing solution. The temperature, which can be as high as 400° F. or more, has a pronounced effect and is considered one of the most important operating variables when considering stability. Increased temperature not only hastens degradation with resultant decrease in viscosity but also increases the rate of reaction of the acid in the formation resulting in treatment of a smaller area of the formation; both being undersireable. Thermal degradation must be distinguished from loss of viscosity (thermal thinning) due to increased temperature, also a common phenomenon.

The present invention generally alleviates several of the problems discussed and provides materials useful for the production of thickened or viscosified acid solutions, and new thickened or viscosified acid solutions containing said materials. The viscosifying polymer undergoes crosslinking in the acid solution and gels; the gelled acid viscosified solution shows improved solution viscosity retention at elevated temperatures encountered in the subterranean formation and, therefore, a flatter thermal thinning profile than that of the available water soluble polymer compositions known.

The following glossary is presented to facilitate an understanding of the designations used to identify the various compounds:

MAPTAC—methacrylamidopropyltrimethylammonium chloride

MAPDMOAC—methacrylamidopropyldimethyl-n-octylammonium chloride

MAPDMDAC—methacrylamidopropyldimethyl-n-dodecylammonium chloride

MAPDMCAC—methacrylylamidopropyldimethylcetylammonium chloride

AM—acrylamide

MAM—methacrylamide

NAM—N-methylacrylamide

NNDMAM—N,N-dimethylacrylamide

DMAPA—dimethylaminopropylmethacrylamide

NaAMPS—sodium 2-acrylamido-2-methylpropane sulfonate

NPPEM—nonylphenoxypoly(ethyleneoxy)ethylmethacry late

DMDAAC—dimethyldiallylammonium chloride

SPP—N-(3-sulfopropyl)-N-methacrylamidopropyl-N,N-dimethyl ammonium betain

VAZO 33 ®—2,2'-azobis(2,4-dimethyl-4-methoxy valeronitrile)

VAZO 52 ®—2,2'-azobis(2,4-dimethyl valeronitrile)

TERGITOL NP 10 ®—10 mole ethoxylate of nonylphenol

VERSENEX 80 ®—pentasodium salt of diethylenetriamine pentaacetic acid

Santonox R ®—a phenolic thioether

Ionol ®—di-t-butyl-p-cresol

Isopar M ®—hydrocarbon oil

As preivously indicated this invention is directed to two types of gelable acid viscosifiers that can be used to produce gelled or crosslinked aqueous acid compositions, namely (I) copolymers containing a crosslinkable moiety in one of the comonomer components and (II) certain polyfunctional reactants that are added to viscosified acid compositions that will react under the proper conditions to crosslink the polymer and form a gelled composition.

(I) The Crosslinkable Copolymers

The new crosslinkable copolymers contain a sufficient concentration of N-alkoxymethylene moieties adequate to crosslink the polymer. This moiety can be found in, for example, the N-(alkoxymethylene)acrylamide, or its corresponding methacrylamide, of the general formula:

wherein
R is hydrogen or methyl, and
R$^v$ is an alkyl group having from 1 to about 10 carbon atoms, preferably from 1 to about 4 carbon atoms.

The crosslinkable copolymers are those containing the groups represented in the following formula A to D:

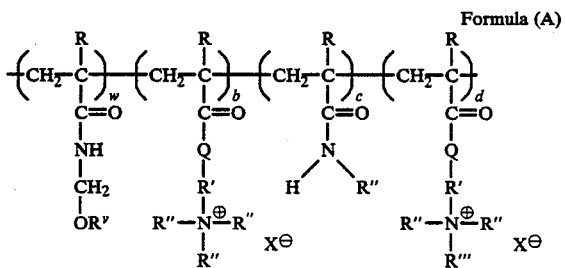

Formula (A)

where
R = H or CH$_3$;
R' = a linear or branched alkylene radical having from 2 to 10 carbon atoms, preferably from 2 to 6 carbon atoms, most preferably from 2 to 4 carbon atoms;
R'' = H or alkyl, linear or branched, having from 1 to 3 carbon atoms, preferably from 1 to 2 carbon atoms;
R''' = an alkyl group, linear or branched, having about 4 to about 25 carbon atoms, preferably from 4 to 18 carbon atoms; aryl, alkaryl or aralkyl having from 6 to 18 carbon atoms;
Q = —NR— or —O—;
X$^\ominus$ = a halogen ion (F, Cl, Br, I) or a methyl sulfate ion;
b = from about 10 to 99.9 mole percent, preferably from 20 to 50 mole percent, most preferably from 30 to 50 mole percent;
c = from about 0 to 90 mole percent, preferably 50 to 80 mole percent, most preferably from 50 to 70 mole percent;
d = from 0 to about 10 mole percent, preferably from 0.1 to about 2 mole percent; and
w = from 0.1 to 10 mole percent, preferably from 0.5 to 5 mole percent.

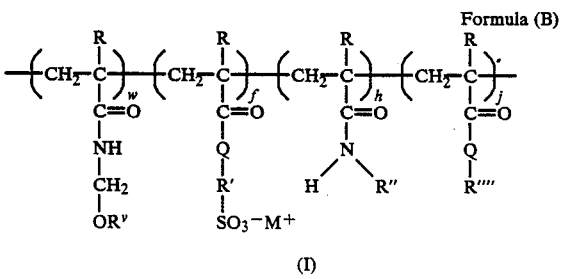

Formula (B)

(I)

where
R = H or CH$_3$;
R' = a linear or branched alkylene or arylene radical having from 2 to 10 carbon atoms, preferably from 2 to 6 carbon atoms, most preferably from 2 to 4 carbon atoms;
R'' = H or alkyl, linear or branched, having from 1 to 3 carbon atoms, preferably 1 or 2 carbon atoms;
M$^+$ = H$^+$, Na$^+$, NH$_4^+$, or other monovalent metal atom (Me$^+$);
Q = a divalent radical such as —O—, —NR—;
R'''' = C$_4$–C$_{18}$ alkyl, C$_7$–C$_{24}$ aralkyl or an ethoxylated C$_7$–C$_{24}$ aralkyl;
f = from about 10 to 60 mole percent, preferably from 20 to 50 mole percent;
h = from about 39.9 to 89.9 mole percent, preferably from 49.9 to 79.9 mole percent;
j = from 0 to 10 mole percent, preferably from 0 to about 2 mole percent; and
w = from 0.1 to 10 mole percent, preferably from 0.5 to 5 mole percent.

Formula (C)

Formula (D)

where
A-⊕ = the residue of a cationic monomer;
B-⊖ = the residue of an anionic monomer;
C-⊕-⊖ = the residue of a Zwitter-ion monomer;
R, R'', R'''', and Q are the same as previously defined in B;
m = 0–49.95 mole percent; preferably 20–35 mole percent;
n = 0–49.95 mole percent, preferably 20–35 mole percent;
p = 0–10 mole percent; preferably 0–2 mole percent;
q = 0–80 mole percent, preferably 30–60 mole percent;
s = 0–99.99 mole percent, preferably 10–49.9 mole percent;
t = 0–95 mole percent, preferably 50–90 mole percent; and
w = from 0.1 to 10 mole percent, preferably from 0.5 to 5 mole percent,
with the proviso that the sum thereof equals 100 mole percent.

One can also use a mixture of A-⊕, B-⊖ and C-⊕-⊖ type monomers in a single copolymer and this is considered within the scope of our claimed invention. In such instances, the copolymers can be represented by the following formula wherein the variable x is modified to produce an appropriate viscosifying agent.

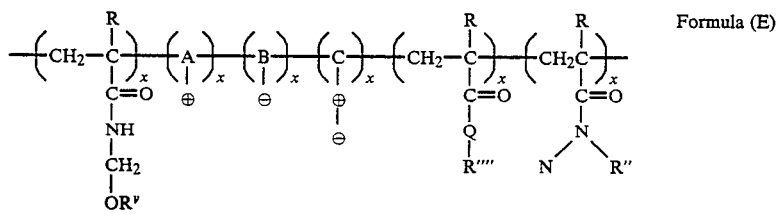

Formula (E)

In the above formulas the total moles of monomers represented by the subscript values equals 100 mole percent.

Illustrative typical monomers that can be used to produce the crosslinkable copolymers are hereinafter set forth. It is also within the scope of this invention to include in the copolymers defined above a small amount, from 0.01 to about 5 mole percent, of a water insoluble or partially soluble monomer. Any of the known monomers can be used such as the acrylate esters, acrylonitrile, the methacrylate esters, methacrylonitrile, the vinyl esters and ethers, and other known monomers. These are well known to those of ordinary skill in the art that any listing thereof would be superfluous. Thus, formulas (A) to (E) are intended to encompass those polymers containing such monomers.

In addition one can have other monomers, such as, acrylic acid, methacrylic acid, maleic acid, hydroxyethyl acrylate, hydroxyethylmethacrylate, 2-hydroxypropyl acrylate, and the like, present.

The crosslinkable copolymers can be obtained as water-in-oil emulsions, or solutions, or recovered in solid form and are used to obtain gelable acid viscosified compositions.

(II) The Polyfunctional Reactants

In the second aspect, a polyfunctional reactant, monomeric, oligomeric, or polymeric is added to the viscosified acid composition to gel the composition. The polyfunctional reactant is kept separate from the viscosified acid composition until the reaction is desired. This can be accomplished in several ways; for example, for water soluble polyfunctional reactants, by keeping the polyfunctional reactant and the viscosifying agent in separate droplets of a water-in-oil emulsion which inverts in the acid solution, essentially this is a one-package water-in-oil emulsion blend, where one emulsion contains the polymer and the second emulsion contains the polyfunctional reactant. Both components are released from their emulsion states upon contact with the acid and gel the viscosified acid composition. Another procedure is to add the viscosifying agent and the polyfunctional reactant separately to the aqueous acid solution; essentially a two-package system. A still further procedure is to mix the two compositions, the viscosifying agent and the polyfunctional reactant, immediately prior to application, and add the blend to the aqueous acid solution. For oil soluble polyfunctional reactants, the reactant can be simply added to the continuous oil phase of the emulsion. Upon inversion in acid medium the polyfunctional reactant is extracted into the aqueous medium and reacts and crosslinks.

The polyfunctional reactant serves to crosslink the viscosifying agent by reacting with the amido, carboxyl and hydroxyl groups present in the viscosifying agent. This serves to gel the viscosified acid composition. The gels produced with the polyfunctional derivatives described herein are useful in subterranean formations having elevated temperatures. The compositions of this invention reduce the thermal thinning effect on the viscosified acid without having some of the undesirable effects experienced with the use of other gelation agents. For instance, many aldehydes disclosed in U.S. Pat. No. 4,191,657 may be either too volatile or too insoluble in aqueous medium, or they may be lachrymatory and present handling problems in the field. In some instances, the rate of gelation or crosslinking is often sluggish resulting in operating dificiencies. In other instances the gelled products cannot be used at the elevated temperatures and are limited for low temperature well use only. The present invention alleviates many of these problems.

The polyfunctional reactants of this invention contain a plurality of (—CH$_2$OR) or (—CH$_2$CH$_2$OR) alkylol groups in the molecule; said groups being attached to a melamine nucleus of the structure:

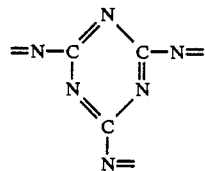

a benzoguanamine nucleus of the structure;

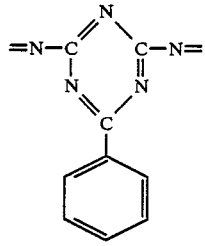

an acetoguanamine nucleus of the structure;

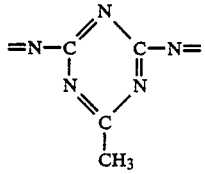

a urea nucleus of the structure:

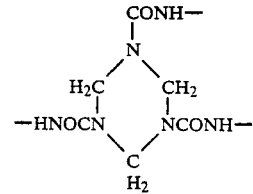

a linear acrylamido polymer or copolymer containing a plurality of units of the formula:

-continued

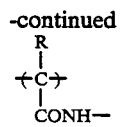

a phenolic nucleus of the structure

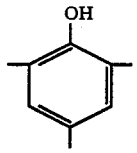

As is recognized by one skilled in the art the above are descriptive of aminoplast and phenolic resins, as well as monomers from which they can be produced. They include the well known alkylated or partially alkylated melamine, guanamine, urea-formaldehyde and glycoluril-formaldehyde resins wherein the unsatisfied valence bonds are substituted with hydrogen, —CH$_2$OR or —CH$_2$CH$_2$OR groups.

The polyfunctional reactants are highly substituted with the alkylol groups and illustrative thereof are hexamethoxymethylmelamine, tetramethoxymethylbenzoguanamine, tetramethyloxymethylacetoguanamine, N,N',N''-trimethoxytrimethylenetriamine, trimethylolphenol, dimethylolphenol, etc.

Although any acid-stable, water soluble viscosifying agent can be reacted with the defined polyfunctional reactants, the preferred viscosifying agents are those hereinafter described and defined by generic formulas A, B, C and D.

The concentration of polyfunctional reactant added to the aqueous acid solution to be viscosified is from about 0.05 to about 50 percent, preferably from about 0.1 to about 10 weight percent, based on the amount of viscosifying agent present.

The polyfunctional reactant can be added in any convenient manner. In a typical embodiment the polymeric viscosifying agent and the polyfunctional reactant are added to the aqueous acid and permitted to react to form a gelled viscosified acid solution. In another embodiment emulsions of the polymeric viscosifier and emulsion of the polyfunctional reactant are prepared. These emulsions can then be used in several ways: (i) prepare a water-in-oil emulsion of said reactant, add it to an emulsion of the polymer viscosifier and add this mixture of emulsions to the aqueous acid for reaction and gelation; (ii) in those instances in which an oil soluble polyfunctional reactant is involved, add the said reactant to the oil phase of the polymer viscosifier and add this to the aqueous acid for reaction and gelation.

Any convenient method for mixing the components to prepare the gelled acid viscosifier composition can be used other than those discussed above. Such procedures are well known in the field and described in the published literature and patents.

Among the polymers that can be gelled in acid solutions used to acidize subterranean formations are the polymers recently discovered by the same inventors that are the subject matter of an independent invention. Those polymers are useful as viscosifying agents to thicken acid solutions that are employed in gas and oil well acidizing operations. The polymers are those cationic polymers (Group A), anionic polymers (Group B) and other polymers (Group C) hereinafter defined.

The Group A Cationic Polymers

The Group A cationic polymers are the polymers presented by Generic Formula A. They are produced by polymerizing monomer (i) alone or in combination with one or more of the monomers (ii), and/or (iii):

(i) an acrylamidoalkyltrialkylammonium halide or a methacrylamidoalkyltrialkylammonium halide;

(ii) acrylamide, or an N-alkylacrylamide; and (iii) a hydrophobic acrylamidoalkyltrialkylammonium halide or methacrylamidoalkyltrialkylammonium halide different than that which was used as monomer (i); as (iii) is defined in Generic Formula A.

When the polyfunctional reactants of this invention are added to the cationic polymers of this group and aqueous acid they produce gelable compositions that perform well in the laboratory under acidizing conditions usually encountered in the field. The crosslinked compositions exhibit good solubility and stability, they exhibit good viscosity retention and thermal thinning properties in acid.

GENERIC FORMULA A

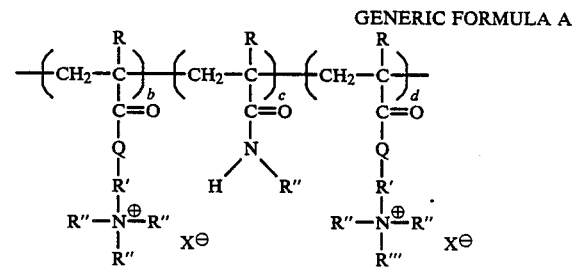

where

R=H or CH$_3$;

R'=a linear or branched alkylene radical having from 2 to 10 carbon atoms, preferably from 2 to 6 carbon atoms, most preferably from 2 to 4 carbon atoms;

R''=H or alkyl, linear or branched, having from 1 to 3 carbon atoms, preferably from 1 to 2 carbon atoms;

R'''=an alkyl group, linear or branched, having about 4 to about 25 carbon atoms, preferably from 4 to 18 carbon atoms; aryl, alkaryl or aralkyl having from 6 to 18 carbon atoms;

Q=—NR— or —O—;

X$\ominus$=a halogen ion (F, Cl, Br, I) or a lower alkyl sulfate ion;

b=from about 10 to 90 mole percent, preferably from 20 to 50 mole percent, most preferably from 30 to 50 mole percent;

c=from about 10 to 90 mole percent, preferably from 50 to 80 mole percent, most preferably from 50 to 70 mole percent; and d=from 0 to about 10 mole percent, preferably from 0 to about 2 mole percent.

Illustrative type (i) water-soluble monomers include methacrylamidopropyltrimethylammonium chloride, methacrylamidopropyltrimethylammonium methylsulfate, methacrylamidopropylhydroxyethyldimethylammonium acetate, methacrylamidopropylisopropylammonium chloride, methacryloylethyltrimethylammonium chloride, acryloylethyltrimethylammonium chloride, methacryloylethyltrimethylammonium methylsulfate, acrylolethyldimethylethylammonium ethylsulfate and the like.

Illustrative type (ii) monomers include acrylamide, N-methylacrylamide alpha-methyl acrylamide, alpha-methyl-N- methylacrylamide.

Illustrative type (iii) hydrophobic monomers include methacrylamidopropyldimethyl-n-octylammonium chloride, methacrylamido-propyldimethyl-n-dodecyl ammonium chloride, methacrylamideopropyldimethyl-cetylammonium chloride, methacryoylethyldimethyloctylammonium chloride, methacryloylethyldimethylcetylammonium chloride, acryloylethyldimethyldodecylammonium chloride, acryloylethyldimethyloctylammonium chloride, methacrylamidopropyldimethylhexylammonium chloride, methacryloylethyldimethylstearylammonium chloride and the like.

The crosslinked viscosified acid compositions containing the Group A cationic polymers possess good solubility, intial viscosity and retained viscosity over a wide temperature range.

The Group B Anionic Polymers

The Group B anionic polymers are the copolymers represented by Generic Formula B. They are produced by copolymerizing three or more of the monomers:

(i) an acrylamidoalkyl sulfonic acid or a methacrylamidoalkyl sulfonic acid or the salts thereof;

(ii) acrylamide or N-alkylacrylamide; and (iii) a hydrophobic acrylic acid ester or methacrylic acid ester or acrylamidohydrocarbyl wherein the hydrocarbyl group is as defined by R" in Generic Formula B.

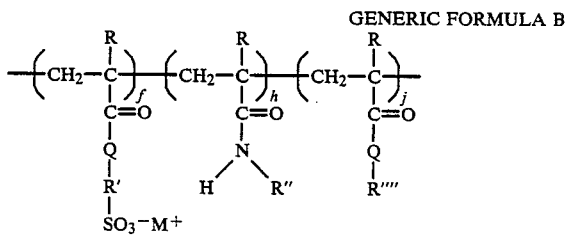

GENERIC FORMULA B where

R=H or $CH_3$;

R'=a linear or branched alkylene or arylene radical having from 2 to 10 carbon atoms, preferably from 2 to 6 carbon atoms, most preferably from 2 to 4 carbon atoms;

$M^+ = H^+$, $Na^+$, or other monovalent metal atom ($Me^+$);

Q=a divalent radical such as —O—, —NR—;

R"=H or alkyl, linear or branched, having from 1 to 3 carbon atoms; preferably 1 or 2 carbon atoms;

R""=$C_4$-$C_{18}$ alkyl, $C_7$-$C_{24}$ aralkyl or an ethoxylated $C_7$-$C_{24}$ aralkyl;

f=from about 10 to 60 mole percent, preferably from 20 to 50 mole percent;

h=from about 40 to 90 mole percent, preferably from 50 to 80 mole percent; and j=from 0 to 10 mole percent, preferably from 0 to about 2 mole percent.

Illustrative type (i) monomers include sodium 2-acrylamido-2-methylpropane sulfonate, sodium 2-acrylamidoethane sulfonate, potassium 3-methacrylamidopropane sulfonate, ammonium p-acrylamidobenzenesulfonate, potassium 6-acrylamidonaphthalene sulfonate, disodium 4-methacrylamidobenzenedisulfonate-1,3, tripotassium 3-acrylamidonaphthalene trisulfonate-1,5,6, and the like.

Illustrative type (ii) monomers include acrylamide, N-methylacrylamide, alpha-methylacrylamide, alpha-methyl-N-methacrylamide.

Illustrative type (iii) hydrophobic monomers include N-butylacrylamide, N-t-butyl-acrylamide, N-decylacrylamide, N-stearylacrylamide, the N-pentylacrylamides, N-butylmethacrylamide, N-decylmethacrylamide, N-benzylacrylamide, N-tolylacrylamide, N-benzylmethacrylamide, N-tolylmethacrylamide, N-t-butylmethacrylamide, the butyl acrylates, the decyl acrylates, phenyl acrylate, tolyl acrylate, t-butyl methacrylate, octyl methacrylate, phenyl methacrylate, nonylphenoxypoly(ethyleneoxy)ethylmethacrylate, and the like.

When polyfunctional reactants of this invention are added to the Group B anionic polymers thay produce gelable viscosified acid compositions useful in acid treating subterranean formations.

The Group C Polymers

The Group C polymers are those represented by Generic Formulas C and D. The polyampholyte copolymers of this group are particularly useful acid viscosifiers in acid solutions used where a high degree of tolerance to calcium ions is required. During the course of an acidizing operation an increasingly higher concentration of calcium chloride generally forms due to the reaction of hydrochloric acid with limestone or dolemite formations. The presence of high concentrations of calcium ions is usually detrimental to the stability of many polyelectrolytes leading to either a loss of solution viscosity or polymer precipitation or both. Gelation with the polyfunctional reactants provides crosslinked acid compositions of good thermal thinning properties.

The Generic Formula C polymers are produced by copolymerizing three or more of the monomers;

(i) a cationic polymerizable monomer;

(ii) an anionic polymerizable monomer;

(iii) a hydrophobic acrylic acid ester or methacrylic acid ester or acrylamidohydrocarbyl wherein the hydrocarbyl group is as defined by R""; and (iv) acrylamide.

The Generic Formula D polymers are produced by copolymerizing at least three of the monomers;

(i) a Zwitter-ion polymerizable monomer;

(ii) a hydrophobic acrylic acid ester or methacrylic acid ester or acrylamidohydrocarbyl wherein the hydrocarbyl group is as defined by R""; and (iii) acrylamide.

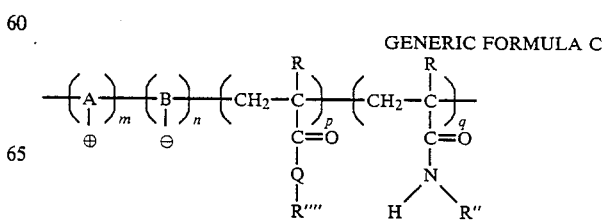

GENERIC FORMULA C

-continued

GENERIC FORMULA D

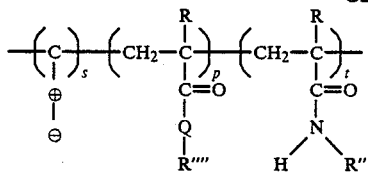

where
A-⊕ = the residue of a cationic monomer;
B-⊖ = the residue of an anionic monomer;
C-⊕-⊖ = the residue of a Zwitter-ion monomer;
R, R", R"" and Q are the same as previously defined from Generic Formula B;
m = 0-45 mole percent; preferably 20-35 mole percent;
n = 0-45 mole percent, preferably 20-35 mole percent;
p = 0-10 mole percent; preferably 0.1-2 mole percent;
q = 10-100 mole percent, preferably 30-60 mole percent;
s = 0-90 mole percent, preferably 10-50 mole percent; and
t = 10-100 mole percent, preferably 50-90 mole percent
with the proviso that the sum thereof equals 100 mole percent.

Of course one can use a mixture of A-⊕, B-⊖ and C-⊕-⊖ type monomers in a single copolymer and this is considered within the scope of our claimed invention. In such instances, the copolymers can be represented by the following formula wherein the variable x is modified to produce an appropriate viscosifying agent.

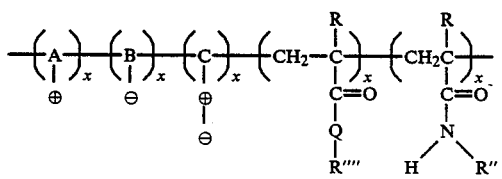

The cationic, anionic and Zwitter-ion monomers are well known to the ordinary skilled polymer chemist; any suitable monomer can be used.

Illustrative suitable cationic polymerizable monomers include dimethyldiallylammonium chloride, methacryloylethyltrimethylammonium chloride, acryloylethyltrimethylammonium methylsulfate, methacryloylethyldimethylethylammonium ethyl sulfate, methacrylamidopropyltrimethylammonium chloride, vinylmethylpyridinium chloride, and the like.

Illustrative suitable anionic polymerizable monomers include sodium 2-acrylamido-2-methylpropane sulfonic acid, sodium acrylate, potassium methacrylate, sodium 2-acrylamidoethane sulfonate, potassium 3-methacrylamidopropane sulfonate, and the like.

The cationic and anionic monomers may be present in the form of an ion-pair such that no other counter ions are present. The ion-pair monomers would enter the polymerization as if they were a single entity. Illustrative ion-pair monomers include dimethylaminopropylmethacrylamide, and 2-acrylamido-2-methylpropane sulfonic acid and the like.

Illustrative suitable Zwitter-ion polymerizable monomers include N-(3-sulfopropyl)-N-methacrylamidopropyl-N,N-dimethyl ammonium betain, N-(3-sulfopropyl)-N-methacryloxyethyl-N,N-dimethylammonium betain, and the like.

The suitable hydrophobic monomers and polyunsaturated monomers are those set forth as illustrative for type (iii) of Generic Formula B. Illustrative type (iii) hydrophobic monomers include N-butylacrylamide, N-t-butylacrylamide, N-decylacrylamide, N-stearylacrylamide, the N-pentylacrylamides, N-butylmethacrylamide, N-decylmethacrylamide, N-benzylacrylamide, N-tolylacrylamide, N-benzylmethacrylamide, N-tolylmethacrylamide, N-t-butylmethacrylamide, the butyl acrylates, the decyl acrylates, phenyl acrylate, tolyl acrylate, t-butyl methacrylate, octyl methacrylate, phenyl methacrylate, nonylphenoxypoly(ethyleneoxy)ethylmethacrylate.

It is recognized that small amounts of other polymerizable monomers can be present in any polymer discussed above.

The polymerization reactions for producing the above polymers can be carried out using any of the methods known in the art. For example as disclosed in U.S. Pat. No. 4,191,657 (B. L. Swanson), U.S. Pat. No. 4,452,940 (M. R. Rosen), U.S. Pat. No. 4,485,209 (Y. L. Fan et al.), U.S. Pat. No. 4,529,782 (Y. L. Fan et al.) and South African Pat. No. 84-01784 (Y. L. Fan et al.). The preferred method, however, is that which was used to produce the polymers in the examples.

In a typical polymerization process the method comprises;
(a) combining the monomers, an oil-soluble surfactant, water and hydrophobic liquid medium in the conventional manner;
(b) homogenizing the mixture from (a) to form a water-in-oil emulsion;
(c) deoxygenating the emulsion from (b);
(d) adding initiator(s) to the deoxygenated emulsion from (c);
(e) heating and stirring the mixture from (d) under polymerization conditions so as to form a water-in-oil polymer emulsion; and
(f) recovering the polymer in whatever physical form desired.

In this procedure, the aqueous phase generally comprises from about 60 weight percent to about 85 weight percent, preferably from about 70 weight percent to about 80 weight percent, of the total composition.

The hydrophobic medium suitable for use in this reaction includes benzene, xylene, toluene, mineral oils, petroleum and mixtures thereof. A preferred hydrophobic medium is Isopar M. Any oil-soluble surfactant that supports a water-in-oil emulsion and does not have an unduly harmful effect on the polymerization reaction can be used. The preferred surfactants are those having a Hydrophile-Lipophile Balance (HLB) of from about 1 to about 10, preferably from about 2 to about 6. These surfactants are well known and include the fatty acid esters, such as sorbitan monolaurate, sorbitan monostearate, sorbitan monooleate, sorbitan trioleate; mono- and diglycerides, such as those obtained from the glycerolysis of edible fats; polyoxyethyleneated fatty acid esters, such as polyoxyethylene-(4)-sorbitan monostearate; polyoxyethyleneated linear alcohols, such as TERGITOL ® 15-S-3 and TERGITOL ® -25-L-3; polyoxyethylene sorbitol esters, such as polyoxyethylene sorbitol beeswax derivatives; polyoxyethyleneated alcohols, such as polyoxyethylene-(2)-cetyl ether; polyester ether copolymers (e.g. Rapisol B-246, ICI); and the like, or mixtures thereof.

Any of the known free radical initiators can be used at catalytic amounts sufficient to carry out the polymerization, generally from about 0.05 to about 0.5, preferably from about 0.1 to about 0.25 weight percent, based on the weight of monomers charged. The initiator can be added directly or diluted with solvent and can be incrementally added during the course of the reaction if desired. Illustrative initiators include the peroxides, such as t-butyl hydroperoxide, t-butyl perbenzoate, benzoyl peroxide, ammonium persulfate, cumene hydroperoxide; the azo compounds, such as VAZO 33, VAZO 52, VAZO 64; redox catalysts; and others known to those of ordinary skill in the art.

The polymerization is carried out at a temperature from about 30° C. to about 80° C., preferably from about 40° C. to about 60° C. The time will vary depending upon the particular reactants being employed, the temperature, the size of the batch and other conditions prevalent during the polymerization. Normally cooling is required.

The pressure is not critical and can be subatmospheric, atmospheric or superatmospheric. The polymerization is preferably carried out under an inert atmosphere. However, at times, small quantities of air or oxygen may be sparged into the reaction mixture to assist in controlling the polymerization reaction rate; the amount of dissolved oxygen in the aqueous phase is usually less than about 1 part per million.

After the polymerization is complete, an antioxidant, or any other desired additive, can be added to the reaction mass, generally in an amount of from about 0.05 to about 5 parts per hundred parts of resin. Any organic antioxidant suitable for the product can be used; it is generally added in the form of a solution in a suitable solvent. Suitable antioxidants include substituted phenols, such as Ionol; thiobisphenols, such as Santonox R ®; hydroquinone derivatives, such as the monomethyl ether of hydroquinone; benzothiazole; ammonium or sodium thiosulfate; alkaline metal thiocyanates; aminocarboxylic acids; or any of the other antioxidants known to those skilled in the art.

An inverting surfactant, e.g. TERGITOL NP10, may be added to the water-in-oil emulsion at the conclusion of the reaction. The surfactants which may be used include polyoxyethylene alkyl phenol, polyoxyethylene (10 mole) cetyl ether, polyoxyethylene alkyl-aryl ether, quaternary ammonium derivatives, potassium oleate, N-cetyl N-ethyl morpholinium ethosulfate, sodium lauryl sulfate, condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (mannitolanhydride, called Mannitan, and sorbitol-anhydride, called Sorbitan). The preferred surfactants are ethoxylated nonyl phenols, ethoxylated nonyl phenol formaldehyde resins, and the like.

The inverting surfactant is used in amounts of from about 0.1 to about 20, preferably from about 1 to about 10 parts per one hundred parts of the polymer.

The water-in-oil emulsion containing the inverting surfactant is solubilized or inverted in the presence of water. The polymer-containing emulsion releases the polymer in the aqueous solution in a very short period of time.

The polymers of Generic Formulas (A) to (D) have reduced viscosity of from about 0.5 dl/g to about 20 dl/g, preferably from about 1 dl/g to about 15 dl/g in 1N NaCl solution at 25° C.

The acidizing solutions generally are based on aqueous hydrochloric acid. The acid concentration usually varies from about 3 to about 28 weight percent HCl. The amount of viscosifying agent present in the acidizing solution will depend upon the viscosity desired. Suitable polymer concentrations are from about 0.25 to about 3 weight percent of the acidizing solution. Commonly about 0.5 to 1.5 weight percent is employed. These acidizing solutions contain either the crosslinkable copolymer at such concentration or the viscosifying agent plus the polyfunctional reactant at such concentration. The preparation of these solutions is well known to one of ordinary skill in this art and can contain any of the additives normally and conventionally used in this art. Any of the other commonly used acids can be employed, e.g., hydrofluoric acid, formic acid, acetic acid, etc., as is known in the art, as well as mixtures. It is also known that higher concentrations of the acid can be used and these are within the scope of our invention. Any concentration of acidizing acid adequate to have an acidizing effect in the formation can be used.

Preparation of these solutions is well known to one of ordinary skill in this art and can contain any of the additives normally and conventionally used in this art. Any of the commonly used acids can be employed. To these acidizing solutions there is added the crosslinkable polymer and/or polyfunctional reactant as previously discussed.

The following examples serve to give specific illustrations of this invention but they are not intended in any way to limit the scope of this invention. Examples 1 to 30 are directed to the crosslinkable copolymer acid viscosifiers and Examples 31 to 74 are directed to the use of the polyfunctional reactant with acid viscosifiers.

EXAMPLE 1

Into a one-liter pyrex glass reactor, equipped with a turbine agitator, thermometer, addition funnel, condenser, nitrogen inlet and outlet, and an external heating or cooling bath, there was charged 704 g of monomeric water-in-oil emulsion. The latter was prepared by emulsifying an aqueous solution consisting of 325.4 g of a 50% aqueous solution of sodium 2-acrylamido-2-methylpropane sulfonate (NaAMPS), 97.5 g of a 50% aqueous solution of acrylamide, 3.8 g of N(n-butoxymethyl)-acrylamide, 0.043 g of Versenex 80, and 109.6 g of deionized water with an oil solution composed of 157.9 g of Isopar M solvent and 9.5 g of Span 80 (sorbitan monooleate). The monomeric emulsion was deaerated by sparging with nitrogen for 30 minutes. Thereafter, an initiator solution consisting of 0.012 g of VAZO 33 and 1.5 g of xylene was introduced. The reactor was heated to 50° C. with the external heating bath. Once the polymerization initiated, an external cooling bath was used and the polymerization temperature was maintained at 50°±2° C. In the meantime, a second initiator solution consisting of 0.18 g of VAZO 52 and 7.5 g of xylene was added in six equal portions with a 10-minute interval between additions. Upon completing the addition of the second initiator, the polymerization was allowed to continue for an additional 4 hours at 50°±2° C. At the end of polymerization, the reactor was cooled to room temperature and a solution of 0.2 g of Santonox R in 2.5 g of xylene together with 10.7 g of TERGITOL NP10 was added to the mixture. The finished polymeric oil-in-water emulsion was milky white in appearance and exhibited a Brookfield viscosity of 390 cps (Model HBT, 10 rpm at 25° C.). The recovered crosslinkable polymer possessed a reduced viscosity in 1N NaCl solution of 0.6 dl/g.

EXAMPLES 2-20

Using the equipment and procedure described in Example 1, a variety of water soluble polymers containing either N(n-butoxymethyl)acrylamide or N(isobutoxymethyl)acrylamide were prepared. The compositions and general characteristics of these polymers are shown in Table A.

TABLE A
CROSSLINKABLE COPOLYMER ACID VISCOSIFIERS

| Example No. | Composition, Mole % (Monomer Type)[5] | | | RV[1] dl/g | 0.3% Solution[2] Viscosity, cps |
|---|---|---|---|---|---|
| | A | C | D | | |
| 2 | 49 (AM) | 50 (NaAMPS) | 1 (NBMA) | 1.5 | 58800 |
| 3 | 48.75 (AM) | 50 (NaAMPS) | 1.25 (NBMA) | 1.3 | 87200 |
| 1 | 48.5 (AM) | 50 (NaAMPS) | 1.5 (NBMA) | 0.6 | 88000 |
| 4 | 49.7 (AM) | 50 (NaAMPS) | 0.3 (NBMA) | 3.3 | 10700 |
| 5 | 47 (AM) | 50 (NaAMPS) | 3 (NBMA) | 1.0 | 232000 |
| 6 | 45 (AM) | 50 (NaAMPS) | 5 (NBMA) | — | 1050 |
| 7 | 48.75 (AM) | 50 (NaAMPS) | 1.25 (NIBMA) | 1 | 163000 |
| 8 | 68.75 (AM) | 30 (MAPTAC) | 1.25 (NBMA) | 0.6 | 32800 |
| 9[3] | 68.75 (AM) | 30 (MAPTAC) | 1.25 (NBMA) | 0.6 | 210000 |
| 10[4] | 68.75 (AM) | 30 (MAPTAC) | 1.25 (NBMA) | 1.0 | 152000 |
| 11[4] | 69 (AM) | 30 (MAPTAC) | 1 (NBMA) | 1.4 | 150000 |
| 12[4] | 68.5 (AM) | 30 (MAPTAC) | 1.5 (NBMA) | 0.6 | 100000 |
| 13[4] | 68.75 (AM) | 30 (MAPTAC) | 1.25 (NBMA) | 0.8 | 127000 |
| 14[4] | 69.25 (AM) | 30 (MAPTAC) | 0.75 (NBMA) | 1.4 | 38600 |
| 15 | 68.5 (AM) | 30 (MAPTAC) | 1.5 (NBMA) | 1.0 | 86000 |
| 16 | 69.55 (AM) | 30 (MAPTAC) | 0.5 (NBMA) | 3.1 | 13800 |
| 17 | 67.5 (AM) | 30 (MAPTAC) | 3 (NBMA) | 0.6 | 146000 |
| 18 | 69 (AM) | 30 (MAPTAC) | 1 (NIBMA) | 0.7 | 161000 |
| 19 Cont. A | 50 (AM) | 50 (NaAMPS) | — | 9.4 | 5400 |
| 20 Cont. B | 70 (AM) | 50 (MAPTAC) | — | 9.7 | 5500 |

[1]Measured in 1N NaCl solution at 25° C., C = 0.0125 g/dl.
[2]Measured in distilled water with a Brookfield Model LVT Viscometer at 10 rpm and 25° C.
[3]Double amount of VAZO 33 was used in polymerization.
[4]Used Witcamide 511 (an alkanolamide surfactant) instead of Span 80.
[5]AM = acrylamide; NaAMPS = sodium 2-acrylamido-2-methylpropane sulfonate; MAPTAC = methacrylamidopropyltrimethylammonium chloride; NBMA = N(n-butoxy-methyl)acrylamide; NIBMA = N(isobutoxymethyl)acrylamide.

TABLE B
VISCOSITY RETENTION AT ELEVATED TEMPERATURES IN 15% HCl SOLUTION

| Example No. | Polymer of Example No. | Polymer Added Wt. % | IV cps | % Viscosity Retention at | | |
|---|---|---|---|---|---|---|
| | | | | 225° F. | 250° F. | 300° F. |
| 21 Control C | 19 | 1.5 | 36 | 45 | 37 | 20 |
| 22 | 1 | 2.1 | 39 | 103 | 124 | 194 |
| 23 | 3 | 2.1 | 50 | 90 | 109 | 137 |
| 24 | 2 | 2.1 | 66 | 97 | 106 | 63 |
| 25 | 7 | 1.5 | 20 | 76 | 92 | 84 |
| 26 Control D | 20 | 1.7 | 167 | 41 | 47 | 58 |
| 27 | 12 | 1.5 | 35 | 52 | 64 | 185 |
| 28 | 10 | 1.5 | 50 | 55 | 75 | 145 |
| 29 | 11 | 1.05 | 19 | 37 | 47 | 141 |
| 30 | 18 | 1.2 | 39 | 54 | 75 | 142 |

EXAMPLES 21-30

The ability of a polymer to viscosify an acid fluid at elevated temperature is measured by the percent of viscosity retention at elevated temperatures with respect to its initial viscosity measured at 100° F. Experimentally, a Fann 50 viscometer (Fann Instrument Co., Houston, Texas) was employed. A sample solution of the polymer in acid fluid was subjected to a constant shear rate of 170 sec$^{-1}$ (100 rpm) and was heated at a programmed rate of 12° F./min. Viscosity retention values at 225°, 250°, and 300° F. were measured and expressed as percent of the initial 100° F. viscosity in Table B. In the table the weight percent crosslinkable polymer added to the HCl solution and the initial viscosity (IV) at room temperature are shown.

As can be seen, the acid compositions containing the crosslinkable copolymers of this invention generally showed a better percentage viscosity retention, and often showed an increase in viscosity, at elevated temperatures in comparison to the controls that did not contain the crosslinkable copolymer gelation agent.

EXAMPLE 31

Into a one-liter pyrex glass reactor, equipped with a turbine agitator, thermometer, addition funnel, condenser, nitrogen inlet and outlet, and an external heating or cooling bath, there was charged about 704 g of a monomeric water-in-oil emulsion. The latter was prepared by emulsifying an aqueous solution consisting of 218.4 g of a 50% aqueous solution of methacrylamidopropyltrimethylammonium chloride (MAPTAC), 211.2 g of a 50% aqueous solution of acrylamide, 0.2 g of Versenex 80 and 106.7 g of deionized water with an oil solution consisting of 157.8 g of Isopar M solvent and 9.5 g of Span 80 (sorbitan monooleate). The monomeric emulsion was deaerated by sparging with nitrogen for 30 minutes. Thereafter, an initiator solution consisting of 0.012 g of VAZO 33 and 0.5 g of xylene was introduced. The reactor was heated to 50° C. Once the polymerization initiated, an external cooling bath was used to maintain a reaction temperature of 50°±2° C. In the meantime, a second initiator solution consisting of 0.18 g of VAZO 52 and 7.5 g of xylene was added in six equal portions with a 10 minute interval between additions. Upon completing the addition of the second initiator, the polymerization mixture was heated for an additional 4 hours at 50°±2° C. At the end of the polymerization, the reactor was cooled to room temperature and a solution of 0.2 g of Santonox R in 2.5 g of xylene together with 10.7 g of TERGITOL NP10 were added to the mixture. The finished polymeric emulsion was milky white in appearance and exhibited a Brookfield viscosity of 1800 cps. The recovered water soluble polymer possessed a reduced viscosity of 11.0 dl/g in 1N NaCl solution.

EXAMPLES 32–49

Using the equipment and procedures described in Example 31, other water soluble polymers useful in preparing gelable acidizing compositions of this invention were prepared. The compositions and general characteristics of these polymers are listed in Table C.

TABLE C
REPRESENTATIVE WATER SOLUBLE POLYMERIC COMPOSITION

| Example No. | Composition, Mole %[3] | | | $RV^1$ dl/g | 0.3% Solution[2] Viscosity, cps |
|---|---|---|---|---|---|
| | Monomer I | Monomer II | Monomer III | | |
| 32 | NaAMPS (25) | AM (75) | — | 11.2 | 5000 |
| 33 | NaAMPS (30) | AM (70) | — | 12.5 | 9050 |
| 34 | NaAMPS (50) | AM (50) | — | 8.8 | 2250 |
| 35 | MAPTAC (20) | AM (80) | — | 10.4 | 7600 |
| 36 | MAPTAC (25) | AM (75) | — | 8.4 | 6650 |
| 37 | MAPTAC (30) | AM (70) | — | 6.2 | 4900 |
| 38[4] | MAPTAC (30) | AM (70) | — | 9.0 | 4200 |
| 39 | MAPTAC (35) | AM (65) | — | 9.5 | 5800 |
| 40 | MAPTAC (40) | AM (60) | — | 7.0 | 5600 |
| 41 | METAC (25) | AM (75) | — | 6.7 | 9800 |
| 42 | METAC (40) | AM (60) | — | 9.2 | 6000 |
| 43 | MAPTAC (40) | AM (55) | AA (5) | 5.5 | 4700 |
| 44 | MAPTAC (30) | AM (60) | AA (10) | 5.9 | 4300 |
| 45 | MAPTAC (30) | AM (65) | NaA (5) | 5.7 | 9600 |
| 46 | MAPTAC (30) | AM (60) | NaA (10) | 5.7 | 7300 |
| 47 | METAC (40) | AM (50) | NaA (10) | 9.8 | 4700 |
| 48 | MAPTAC (30) | AM (55) | NaA (15) | 5.5 | 2300 |
| 49 | MAPTAC (30) | AM (60) | NaA (10) | 5.2 | 10200 |

[1]Measured in 1N NaCl solution at 25° C., C = 0.0125 g/dl.
[2]Measured in water with a Brookfield Viscometer Model LVT at 0.6 rpm and 25° C.
[3]NaAMPS = sodium 2-acrylamido-2-methylpropane sulfonate; AM = acrylamide; MAPTAC = methacrylamidopropyltrimethylammonium chloride; METAC = methacryloylethyltrimethylammonium chloride; AA = acrylic acid; NaA = sodium acrylate.
[4]Used Rapisol B-246 surfactant (ICI) instead of Span 80.

The following list is representative polyfunctional reactants used in subsequent examples.

| REPRESENTATIVE POLYFUNCTIONAL REACTANTS | | |
|---|---|---|
| Tradename (Producer) | chemical Nature | Preferred* Methods of Application |
| Cymel 303 (American Cyanamid) | Hexamethoxymethylmelamine | 1  2  3 |
| Cymel 385 (American Cyanamid) | Partially alkylated melamine | 1  2  4 |
| Beetle 60 (American Cyanamid) | Methylated urea-formaldehyde resin | 1  2  3 |
| Beetle 80 (American Cyanamid) | Butylated urea-formaldehyde resin | 1  2  3 |
| Cymel 1156 (American Cyanamid) | Highly butylated, monomeric, melamine-formaldehyde resin | 1  2  3 |
| Cymel 1123 (American Cyanamid) | Methylated, ethylated benzoqanamine | 1  2  4 |
| Cymel 1170 (American Cyanamid) | Fully butylated glyol-urilformaldehyde resin | 1  2  3 |
| | Poly[N—(n-butoxymethyl)-acrylamide] | 1  2  3 |
| Bakelite BRL-1100 (Union Carbide) | Trimethylol phenol | 1  2  4 |

*Preferred Methods of Application to Prepare Gelable or Gelled Acid Viscosifier:
1 - applied separately as a two-package system.
2 - mixing the two components immediately prior to application.
3 - add to the oil phase of a water-in-oil emulsion to afford a one-package system.
4 - add as a water-in-oil emulsion to the polymeric emulsion to afford a one-package system.

EXAMPLE 50

An acid fluid was prepared by dissolving the polymer of Example 34 in 15% HCl to give a polymer concentration of 1.25% by weight. The solution possessed a Brookfield viscosity of 70 cps (Model LVT, 60 rpm at 25° C.). To the acid fluid was added 0.12% by weight of Cymel 385 and the mixture was heated in a water bath at 65° C. for 30 minutes. A highly viscous gel resulted.

EXAMPLE 51

Example 50 was repeated with the exception that the polymer used was that of Example 36. The resultant acid fluid possessed a Brookfield viscosity of 590 cps. Upon heating at 65° C. for 30 minutes, a highly viscous gel resulted.

EXAMPLE 52

Example 50 was repeated with the exception that the polymer used was that of Example 36 and the polyfunctional reactant used was Bakelite BRL-1100. The acid fluid possessed an initial viscosity of 860 cps. Upon heating at 65° C. for 30 minutes in the presence of Bakelite BRL-1100, it was transformed to a viscous gel.

EXAMPLE 53

A mixture of 50 g of the polymeric emulsion of Example 36 and 0.75 g of Cymel 1156 was mixed thoroughly with a Waring blender. The resultant water-in-oil emulsion contained 1.5% by weight of the polyfunctional reactant in the continuous oil phase. An acid fluid containing 1.25% by weight of polymer from this emulsion in 15% HCl was prepared and gave a Brookfield viscosity of 670 cps. Upon heating at 65° C. for 1 hour, the fluid was transformed to a viscous mass.

EXAMPLE 54

Example 53 was repeated with the exception that the polyfunctional reactant used was Cymel 1170. The initial vicosity of a 1.25% by weight of polymer in 15% HCl solution was 720 cps. Upon heating at 65° C. for 30 minutes, the acid fluid was transformed to a viscous mass.

EXAMPLE 55

This example illustrates the procedure for preparing a water-in-oil emulsion containing a water-soluble polyfunctional reactant. An aqueous solution containing 25 g of Cymel 385 and 51 g of water and an oil solution containing 22.5 g of Isopar M solvent and 1.5 g of Witcamide 511 surfactant were emulsified with a Waring blender. The resultant milky white water-in-oil emulsion exhibited a Brookfield viscosity of 1920 cps (Model HBT, 10 rpm at 25° C.). The emulsion contained 20% by weight of the polyfunctional reactant melamine.

EXAMPLE 56

A one-package water-in-oil emulsion was prepared by mixing 50 g of the polymeric emulsion of Example 34 and 7.5 g of the oligomeric emulsion of Example 55. The resultant water-in-oil emulsion contained 28.7% of active polymer. An acid fluid was prepared from this emulsion to give a 1.25% active polymer in 15% HCl solution. The solution possessed a Brookfield vicosity of 590 cps. Upon heating at 65° C. for 30 minutes, the acid fluid was transformed to a viscous gel.

EXAMPLE 57

A series of crosslinked compositions was prepared using as viscosifying agent a polymeric composition that was a duplicate run of Example 37. In this series the crosslinking ability of different polyfunctional reactants at 5% concentration based on the weight of viscosifying agent was evaluated and their effect on viscosity retention was determined. For comparison purposes the viscosifying agent without added polyfunctional reactant was also evaluated (Control). The viscosity was measured as described in Example 21. As shown by the data in Table D, the compositions of this invention retained viscosity, and in many instances increased in viscosity, whereas the viscosity of the control decreased significantly. The percent viscosity retention is compared to that of the initial viscosity of the composition measured at 100° F.

TABLE D

| Run Control | Polyfunctional Reactant | IV cps | % Viscosity Retention at 225° F. | 250° F. | 300° F. |
|---|---|---|---|---|---|
| (a) | — | 131 | 38 | 41 | 40 |
| (b) | Beetle-60 | 137 | 102 | 98 | 102 |
| (c) | Cymel-1123 | 134 | 79 | 99 | 109 |
| (d) | Cymel-1156 | 143 | 73 | 79 | 93 |
| (e) | Cymel-1170 | 131 | 72 | 105 | 110 |
| (f) | Cymel-303 | 128 | 100 | 134 | 120 |
| (g) | Cymel-385 | 126 | 74 | 89 | 104 |

EXAMPLE 58

In Table E the effect on viscosity retention at different concentrations of the polyfunctional reactant is shown. The viscosity agent employed was that of Example 37 at a concentration of about 1.05 weight percent. The concentration of polyfunctional reactant is based on the amount of said agent; the reactant employed was Cymel-1156. The improved viscosity retention is evident.

TABLE E

| Run | Polyfunctional Reactant | IV cps | % Viscosity Retention at 225° F. | 250° F. | 300° F. |
|---|---|---|---|---|---|
| Control | — | 138 | 40 | 44 | 41 |
| Control | — | 113 | 45 | 44 | 43 |
| (a) | 1.25% | 125 | 54 | 69 | 88 |
| (b) | 3.5% | 121 | 67 | 82 | 88 |
| (c) | 5% | 93 | 69 | 68 | 81 |
| (d) | 6% | 123 | 73 | 81 | 83 |

EXAMPLES 59 to 74

The following examples illustrate the benefit of the present invention. Through an "in-situ" crosslinking reaction, the polymer-reactive oligomer system described in this invention affords significantly higher viscosifying efficiencies in acid fluids at elevated temperatures than those of conventional water soluble polymers. The thermal thinning behavior or viscosity retention at elevated temperatures of a number of representative polymer-polyfunctional reactant systems was measured with a Fann 50 viscometer (Fann Instrument Co., Houston, Texas). The acid fluid samples were subjected to a constant shear rate of 170 sec$^{-1}$ (100 rpm) and were heated at a programmed rate of 12° F./min. Viscosity retention values at 225°, 250°, and 300° F. were measured and listed in Table F as percent of initial 100° F. viscosity. As results show in Table F, the polymer-polyfunctional reactant systems of this invention afford marked enhancement in acid fluid viscosities at elevated temperatures when compared to Control E, F, and G. The polyfunctional reactant was present at a 5 weight percent concentration based on the amount of viscosifying agent used with the exception that 25 weight percent was employed in Example 69.

TABLE F

VISCOSITY RETENTION AT ELEVATED TEMPERATURES IN 15% HCl SOLUTION

| Example No. | Polymer of Example No. | Polyfunctional Reactant | % Viscosity Retention at 225° F. | 250° F. | 300° F. |
|---|---|---|---|---|---|
| 59 Control E | GUAR Gum[1] | — | 0 | 0 | 0 |
| 60 Control F | CMHEC[1,2] | — | 0 | 0 | 0 |
| 61 Control G | Xanthan Gum[1] | — | 2 | 1 | Nil |
| 62 | 35 | — | 30 | 34 | 32 |
| 63 | 37 | — | 41 | 47 | 58 |
| 64 | 33 | — | 37 | 28 | 22 |
| 65 | 46 | — | 55 | 56 | 52 |
| 66 | 47 | — | 64 | 62 | 55 |
| 67 | 37 | Beetle-60 | 102 | 93 | 106 |
| 68 | 37 | Cymel-1123 | 78 | 98 | 109 |
| 69 | 37 | Cymel-1156 | 72 | 78 | 92 |
| 70 | 36 | Cymel-1156 | 143 | 146 | 102 |
| 71 | 40 | Beetle-60 | 92 | 87 | 86 |
| 72 | 37 | Cymel-303 | 100 | 134 | 120 |
| 73 Control H | 34 | — | 38 | 35 | — |
| 74 | 34 | Cymel-385 | 69 | 84 | 118 |

[1] L. R. Norman, M. W. Conway, J. M. Wilson, J. of Petro. Eng., pp. 2011–2018, Nov. 1984.
[2] Carboxymethylhydroxyethylcellulose.

The following experiments show the preparation of additional polymeric compositions that are useful in the production of viscosified acid compositions to which can be added the polyfunctional reactants disclosed in this invention to obtain gelable or gelled viscosified acid compositions.

EXPERIMENT 1

Into a one-liter pyrex glass reactor, equipped with a turbine agitator, thermometer, addition funnel, condenser, nitrogen inlet and outlet, and an external heating or cooling bath, there was charged 704 g of a monomeric water-in-oil emulsion. The latter was prepared by emulsifying an aqueous solution that consisted of 245.2 g of a 50% aqueous solution of (MAPTAC) methacrylamidopropyltrimethylammonium chloride, 184.4 g of a 50% aqueous solution of (AM) acrylamide, 106.8 g of deionized water, and 0.17 g of Versenex 80 with an oil solution consisting of 157.9 g of Isopar M oil and 9.5 g of Span 80 ® (sorbitan monooleate). The monomeric emulsion was deaerated by sparging with nitrogen for 30 minutes. Thereafter, an initiator solution consisting of 0.012 g of VAZO 33 and 1.5 g of xylene was introduced. The reactor was heated to 50° C. with the external heating bath. Once the polymerization initiated, an external cooling bath was employed and the polymerization temperature was maintained at 50°±2° C. In the meantime, a second initiator solution consisted of 0.18 g of VAZO 52 and 7.5 g of xylene was added in six equal portions with a 10 minute interval between additions. Upon completing the addition of the second initiator, the polymerization mixture was heated for an additional 4 hours at 50°±2° C. At the end of polymerization, the reactor was cooled to room temperature and a solution of 0.2 g of Santonox R in 2.5 g of xylene together with 10.7 g of TERGITOL NP 10 was added to the mixture. The finished polymeric emulsion was milky white in appearance and exhibited a Brookfield viscosity of 1560 cps (Model HBT, 10 rpm at 25° C.). The recovered polymer possessed a reduced viscosity in 1N NaCl solution of 9.7 dl/g.

EXPERIMENTS 2–8

Using the equipment and procedure described in Experiment 1, a series of (MAPTAC-AM) copolymers having different degrees of ionic characters was prepared. The compositions and general characteristics of these polymers are listed in Table I. For completion; data for Experiment 1 is also included.

TABLE I
CATIONIC POLYMERS DERIVED FROM MAPTAC

| Expt. | Composition, Mole % MAPTAC | AM | RV[1] dl/g | 0.3% Solution[2] Viscosity, cps |
|---|---|---|---|---|
| 2 | 17.6 | 82.4 | 6.2 | 4650 |
| 3 | 20 | 80 | 10.4 | 7550 |
| 4 | 25 | 75 | 11.0 | 7250 |
| 1 | 30 | 70 | 9.7 | 5450 |
| 5 | 35 | 65 | 9.5 | 5800 |
| 6 | 40 | 60 | 7.9 | 2850 |
| 7 | 40 | 60 | 9.1 | 5800 |
| 8 | 50 | 50 | 7.6 | 3160 |

[1]Measured in 1N NaCl solution at 25° C., C = 0.0126 g/dl.
[2]Measured in distilled water, Brookfield Viscometer Model LVT, 0.6 rpm, at 25° C.

EXPERIMENT 9

This experiment illustrates a general procedure for the preparation of a hydrophobemodified cationic monomer using an alkylating agent. Into a 100-ml, 3-necked pyrex flask, equipped with a mechanic stirrer, thermometer, condenser, addition funnel and an external cooling bath, there was charged 34.7 g of the amino monomer, dimethylaminopropylmethacrylamide (DMAPMA). The flask was cooled to about 10° C. with the cooling bath, and 29.9 g of n-octyl chloride was added in a dropwise manner over a one-hour period. The reaction mixture was stirred for another hour at room temperature. The product, methacrylamidopropyldimethyl-n-octylammonium chloride, was used for polymerization without further purification.

EXPERIMENTS 10 and 11

Using the equipment and procedures described in Experiment 9 and the appropriate molar quantities of reactants, two additional hydrophobe-modified cationic monomers were prepared. The results of Experiments 9 to 11 are summarized in Table II.

TABLE II
HYDROPHOBE-MODIFIED CATIONIC MONOMERS

| Expt. Number | Amino Monomer | Alkylating Agent | Product |
|---|---|---|---|
| 9 | DMAPMA | n-octyl chloride | methacrylamidopropyl-dimethyl-n-octyl-ammonium chloride |
| 10 | DMAPMA | n-dodecyl chloride | methacrylamidopropyl-dimethyl-n-dodecyl-ammonium chloride |
| 11 | DMAPMA | cetyl chloride | methacrylamidopropyl-dimethylcetylammonium-chloride |

EXPERIMENT 12

A polymer was prepared using the equipment and procedure described in Experiment 1 with the exception that the aqueous solution was composed of 245.3 g of a 50% aqueous solution of MAPTAC, 185.7 g of a 50% aqueous solution of acrylamide, 1.19 g of methacrylamidopropyldimethyl-n-octylammonium chloride prepared in Experiment 9, 0.18 g of Versenex 80, and 104.2 g of deionized water. The finished polymeric emulsion exhibited a Brookfield viscosity of 1560 cps (Model HBT, 10 rpm at 25° C.). The recovered polymer possessed a reduced viscosity of 8.1 dl/g in 1N NaCl solution at 25° C.

EXPERIMENTS 13 and 14

Using the procedure described in Experiment 12, a (MAPTAC-AM-methacrylamidopropyldimethyl-n-dodecylammonium chloride) terpolymer and a (MAPTAC-AM-methacrylamidopropyldimethylcetylammonium chloride) terpolymer were prepared. The compositions and general characteristics of the polymers are shown in Table III.

TABLE III
HYDROPHOBE-MODIFIED CATIONIC MONOMERS

| Expt Number | Composition, Mole % Hydrophobe[1] | MAPTAC | AM | RV[2] dl/g | 0.3% Solution Viscosity, cps |
|---|---|---|---|---|---|
| 12 | 0.2 (Experiment 9) | 29.8 | 70 | 8.1 | 900 |
| 13 | 0.2 (Experiment 10) | 29.8 | 70 | 8.4 | 2500 |
| 14 | 0.2 (Experiment 11) | 29.8 | 70 | 8.6 | 950 |

[1]As indicated by the Experiment number.
[2]Measured in 1N NaCl solution at 25° C., C = 0.0125 g/dl.
[3]Measured in distilled water at 25° C. with a Brookfield Model LVT Viscometer at 0.6 rpm.

EXPERIMENT 15

Into a one-liter pyrex glass reactor, equipped with a turbine agitator, thermometer, addition funnel, condenser, nitrogen inlet and outlet, and an external heating or cooling bath, there was charged 708 g of a water-in-oil monomers emulsion. The latter was prepared by emulsifying, with a Waring blender, an aqueous solution consisting of 249.8 g of a 50% aqueous solution of sodium 2-acrylamido-2-methylpropane sulfonate (NaAMPS), 178.8 g of a 50% aqueous solution of acrylamide (AM), 1.9 g of N-decylacrylamide, 0.17 g of Versenex 80 and 105.8 g of deionized water with an oil solution composed of 157.8 g of Isopar M solvent and 14.2 g of Span 80 surfactant (sorbitan monooleate). The monomeric emulsion was deaerated by sparging with nitrogen for 30 minutes. Thereafter, an initiator solution consisting of 0.012 g of VAZO 33 (2,2'-azobis-[2,4-dimethyl-4-methoxy valeronitrile]) and 1.5 g of xylene was introduced. The reactor was heated to 50° C. Once the polymerization initiated, an external cooling bath was used to maintain the reactor temperature at 50°±2° C. In the meantime, a second initiator solution, consisting of 0.18 g of VAZO 52 (2,2'-azobis-[2,4-dimethyl valeronitrile]) and 7.5 g of xylene, was added in six equal portions with a 10-minute interval between additions. Upon completion of the addition of the second initiator, the polymerization was heated for 4 more hours at 50°±2° C. At the end of polymerization, the reactor was cooled to room temperature and a solution of 0.19 g of Santonox R in 2.5 g of xylene, together with 10.8 g of TERGITOL NP10 surfactant, was added to the mixture. The finished polymeric emulsion was milky white in appearance and exhibited a Brookfield viscosity of 1200 cps (Model HBT, 10 rpm at 25° C.). The recovered polymer showed a reduced viscosity of 10.8 dl/g in 1N NaCl solution at 25° C.

EXPERIMENTS 16-22

Using the equipment and procedure described in Experiment 15, six additional terpolymers containing N-decylacrylamide were prepared. The compositions and general characteristics of these polymers are listed in Table VI.

TABLE VI

ANIONIC (NaAMPS-AM-NDAM) TERPOLYMERS

| Expt. No. | Mole %[1] | | | RV[2] dl/g | 0.3% Solution[3] Viscosity, cps |
|---|---|---|---|---|---|
| | NaAMPS | AM | NDAM | | |
| 16 | 30 | 69 | 1 | 10.3 | 9000 |
| 17 | 30 | 69.5 | 0.5 | 11.7 | 7950 |
| 18 | 30 | 69.9 | 0.1 | 11.8 | 8350 |
| 19 | 40 | 59.8 | 0.2 | 10.2 | 4000 |
| 20 | 50 | 49 | 1 | 8.6 | 1800 |
| 21 | 50 | 49.5 | 0.5 | 8.8 | 1950 |
| 22 | 50 | 49.8 | 0.2 | 9.7 | 3550 |

[1]Monomer feed composition
[2]Measured in 1N NaCl solution at 25° C. C = 0.0125 g/dl.
[3]Measured in distilled water at 25° C. using a Brookfield Model LVT Viscometer at 0.6 rpm and 25° C.

EXPERIMENTS 23-29

Using the equipment and procedure described in Experiment 15, terpolymers containing different types of hydrophobes were prepared. The compositions and general characteristics of these polymers are listed in Table VII. Also included in Table VII are two (NaAMPS-AM) copolymer used as controls.

TABLE VII

ANIONIC (NaAMPS-AM-HYDROPHOBE) TERPOLYMERS

| Expt. No. | Mole % | | | | RV[2] dl/g | 0.3% Solution[3] Viscosity, cps |
|---|---|---|---|---|---|---|
| | Na AMPS | AM | Hydrophobe[1] | | | |
| 23 | 30 | 69.9 | NPPEM | 0.1 | 11.6 | 10800 |
| 24 | 30 | 69.5 | NPPEM | 0.5 | 8.1 | 9050 |
| 25 | 30 | 69.9 | NBMA | 0.1 | 12.4 | 9000 |
| 26 | 30 | 69.5 | NBMA | 0.5 | 11.4 | 9300 |
| 27 | 30 | 69 | NBMA | 1.0 | 11.4 | 10750 |
| 28 | 30 | 69.9 | NTBMA | 0.1 | 11.1 | 7050 |
| 29 | 30 | 69 | NTBMA | 1.0 | 11.3 | 7850 |
| Cont. C | 40 | 60 | — | | 10.4 | 6400 |
| Cont. D | 30 | 70 | — | | 10.4 | 9900 |

[1]NPPEM = Nonylphenoxypoly(ethyleneoxy)ethylmethacrylate; NBMA = N—benzylmethacrylamide; NTBMA = N—t-butylmethacrylamide.
[2]Measured in 1N NaCl solution at 25° C., C = 0.0125 g/dl.
[3]Measured in distilled water at 25° C. using a Brookfield Model LVT Viscometer at 0.6 rpm and 25° C.

EXPERIMENT 30

Into a one-liter pyrex glass reactor, equipped with a turbine agitator, thermometer, addition funnel, condenser, nitrogen inlet and outlet, and an external heating or cooling bath, there was charged about 700 g of a water-in-oil monomeric emulsion. The latter was prepared by emulsifying, with a Waring blender, an aqueous solution consisting of 162.4 g of sodium 2-acrylamido-2-methylpropane sulfonate as the anionic monomer, 92 g of a 62% aqueous solution of dimethyldiallylammonium chloride as the cationic monomer, 150.3 g of a 50% aqueous solution of acrylamide as the water soluble monomer, 1.4 g of nonylphenoxypoly(ethyleneoxy)ethylmethacrylate as the hydrophobic monomer, 0.14 g of Versenex 80, and 130.2 g of deionized water with an oil solution composed of 157.8 g of Isopar M solvent and 9.5 g of Span 80 surfactant (sorbitan monooleate). The monomeric emulsion was deaerated by nitrogen sparging for 30 minutes. Thereafter, an initiator solution consisting of 0.012 g of VAZO 33 (2,2'-azobis[2,4-dimethyl-4-methoxy valeronitrile]) and 1.5 g of xylene was introduced. The reactor was heated to 50° C. Once the polymerization initiated, an external cooling bath was used to maintain the reactor temperature at 50°±2° C. In the meantime, a second initiator solution consisting of 0.18 g of VAZO 52 (2,2'-azobis[2,4-dimethyl valeronitrile]) and 7.5 g of xylene was added in six equal portions with a 10-minute interval between additions. Upon completion of the addition of the second initiator, the polymerization was heated for 4 more hours at 50°±2° C. At the end of the polymerization, the reactor was cooled to room temperature and a solution of 0.19 g of Santonox R in 2.5 g of xylene together with 10.8 g of TERGITOL NP10 surfactant was added to the mixture. The finished polymeric emulsion was milky white in appearance and exhibited a Brookfield viscosity of 880 cps (Model HBT, 10 rpm at 25° C.). The recovered polymer possessed a reduced viscosity of 6.2 dl/g in 1N NaCl solution.

EXPERIMENT 31

A polymer was prepared using the equipment and procedures described in Experiment 30, with the exception that the aqueous solution consisted of 163.4 g of a 50% aqueous solution of sodium 2-acrylamido-2-methylpropane sulfonate as the anionic monomer, 92.5 g of a 62% aqueous solution of (DMDAAC) dimethyldiallylammonium chloride as the cationic monomer, 151.5 g of a 50% aqueous solution of acrylamide as the water soluble monomer, 0.14 g of Versenex 80, and 128.9 g of deionized water. The finished polymeric emulsion exhibited a Brookfield viscosity of 1500 cps (Model HBT, 10 rpm at 25° C.). The recovered polymer possessed a reduced viscosity of 7.6 dl/g in 1N NaCl solution at 25° C.

EXPERIMENT 32

Using the equipment and general procedures described in Experiment 30, a copolymer composed of 30 mole percent of N-(3-sulfopropyl)-N-methacrylamidopropyl-N,N-dimethylammonium-betain (SPP) and 70 mole percent of acrylami de was prepared. The resultant polymeric emulsion exhibited a Brookfield viscosity of 1,400 cps. The recovered polymer possessed a reduced viscosity (RV) of 7.5 dl/g in 1N NaCl solution at 25° C.

EXPERIMENT 33

Experiment 32 was repeated with the exception that a small amount of a hydrophobic comonomer, nonylphenoxy-poly(ethyleneoxy)ethylmethacrylate (NPPEM), was incorporated into the polymerization formulation so that the resultant product was a (NPPEM-SPP-AM) terpolymer containing 0.1, 30, and 69.9 mole percent of these monomers, respectively. The resultant polymeric emulsion exhibited a Brookfield viscosity of 1,600 cps. The recovered polymer possessed a reduced viscosity of 6.7 dl/g.

What we claim is:

1. A gelable acidic composition, suitable for acidizing a subterranean formation susceptible of attack by an acid, comprising: (a) an aqueous acid solution; (b) a water soluble acrylamide type polymer selected from the group consisting of polymers containing monomeric repeating units represented by the following formulas:

GENERIC FORMULA A

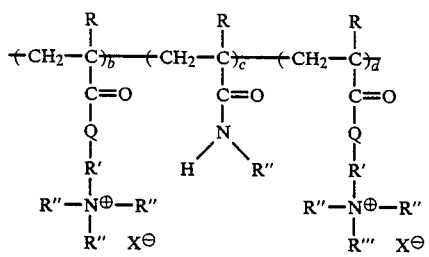

where
R=H or CH₃
R'=a linear or branched alkylene radical having from 2 to 10 carbon atoms;
R"=H or alkyl, linear or branched, having from 1 to 3 carbon atoms;
R'''=an alkyl group, linear or branched, having about 4 to about 25 carbon atoms, or aryl, alkaryl or aralkyl having from 6 to 18 carbon atoms;
Q=—NR— or —O—;
X⁻=a halogen ion or a lower alkyl sulfate ion;
b=from about 10 to 90 mole percent;
c=from about 10 to 90 mole percent; and
d=from 0 to about 10 mole percent;

GENERIC FORMULA B

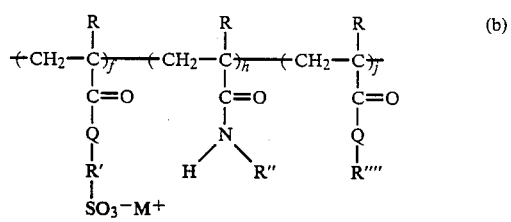

where
R=H or CH₃;
R'=a linear or branched alkylene or arylene radical having from 2 to 10 carbon atoms
R"=H or alkyl, linear or branched, having from 1 to 3 carbon atoms;
M⁺=H⁺, Na⁺, NH₄⁺, or other monovalent metal cation;
Q=a divalent radical such as —O—, —NR—;
R''''=C₄-C₁₈ alkyl, C₇-C₂₄ aralkyl or an ethoxylated C₇-C₂₄ aralkyl;
f=from about 10 to 60 mole percent;
h=from about 40 to 90 mole percent; and
j=from 0 to 10 mole percent;

GENERIC FORMULA C

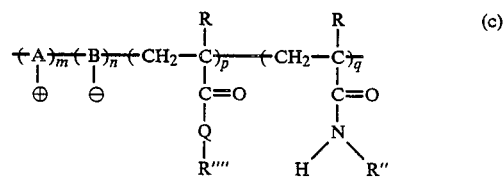

GENERIC FORMULA D

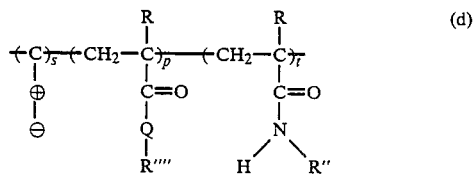

where
A⊕=the residue of a cationic monomer;
B⊖=the residue of an anionic monomer;
C⊕⊖=the residue of a Zwitter-ion monomer;
R, R", R'''' and Q are the same as previously defined for Generic Formula B;
m=0-45 mole percent;
n=0-45 mole percent;
p=0-10 mole percent;
q=10-100 mole percent;
s=0-90 mole percent; and
t=10-100 mole percent
with the provisos that the sums of the mole percents equals 100 mole percent and water soluble monomeric repeating units are provided in an amount sufficient to provide good solubility in the aqueous acidic composition; and (c) from about 0.05 to about 50 weight percent based on component (b) of a polyfunctional reactant capable of crosslinking said water soluble polymer in said acidic composition selected from he group consisting of monomers, oligomers and polymers containing a plurality of —CH₂OR or —CH₂CH₂OR alkylol groups attached to:

(A) a melamine nucleus of the structure:

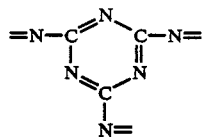

(B) a benzoguanamine nucleus of the structure:

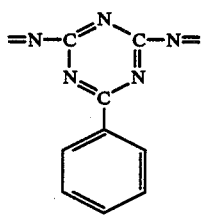

(C) an acetoguanamine nucleus of the structure:

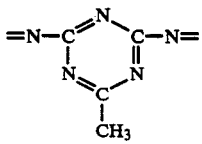

(D) a urea nucleus of the structure:

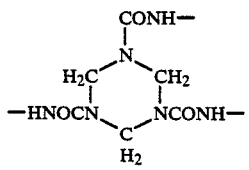

(E) a linear acrylamido polymer or copolymer containing a plurality of units of the formula:

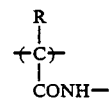

or;

(F) a phenolic nucleus of the structure

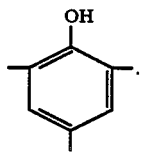

2. A gelable acidic composition as claimed in claim 1 wherein component (a) is hydrochloric acid having a concentration of from about 1 to about 30 weight percent.

3. A gelable acidic composition as claimed in claim 1 wherein component (c) is present at from about 0.1 to 10 weight percent.

4. A gelable acid composition as claimed in claim 1 wherein component (b) is a copolymer comprising methacrylamidopropyltrimethylammonium chloride and acrylamide, and component (c) is an alkylated or partially alkylated monomeric and oligomeric melamine formaldehyde resin.

5. A gelable acid composition as claimed in claim 1 wherein component (b) is a copolymer comprising methacrylamidopropyltrimethylammonium chloride and acrylamide, and component (c) is an alkylated or partially alkylated monomeric and oligomeric urea formaldehyde resin.

6. A gelable acid composition as claimed in claim 1 wherein component (b) is a copolymer comprising methacrylamidopropyltrimethylammonium chloride and acrylamide, and component (c) is an alkylated benzoguanamine resin.

7. A gelable acidic composition as claimed in claim 1 wherein component (b) is a copolymer comprising methacrylamidopropyltrimethylammonium chloride and acrylamide, and component (c) is a fully alkylated glycoluril formaldehyde resin.

8. A gelable acidic composition as claimed in claim 1 wherein component (b) is a copolymer comprising (i) sodium 2-acrylamido-2-methylpropane sulfonate and (ii) acrylamide.

* * * * *